No. 651,789. Patented June 12, 1900.
F. H. WOOLF.
CANDY CUTTING MACHINE.
(Application filed May 3, 1897.)
(No Model.)

Witnesses
Harold G. Bartt
D. M. Carter

Inventor
Frank H. Woolf.
by Francis W. Parker
his Attorneys

UNITED STATES PATENT OFFICE.

FRANK H. WOOLF, OF CHICAGO, ILLINOIS.

CANDY-CUTTING MACHINE.

SPECIFICATION forming part of Letters Patent No. 651,789, dated June 12, 1900.

Application filed May 3, 1897. Serial No. 634,823. (No model.)

*To all whom it may concern:*

Be it known that I, FRANK H. WOOLF, a citizen of the United States, residing at Chicago, in the county of Cook and State of Illinois, have invented certain new and useful Improvements in Candy-Cutting Machines, of which the following is a specification.

My invention relates to cutting-machines for cutting plastic material and the like into pieces of any desired shape, and has for its object to provide a new and improved machine for this purpose, of which the following is a description, reference to be had to the accompanying drawings, wherein—

Figure 1:
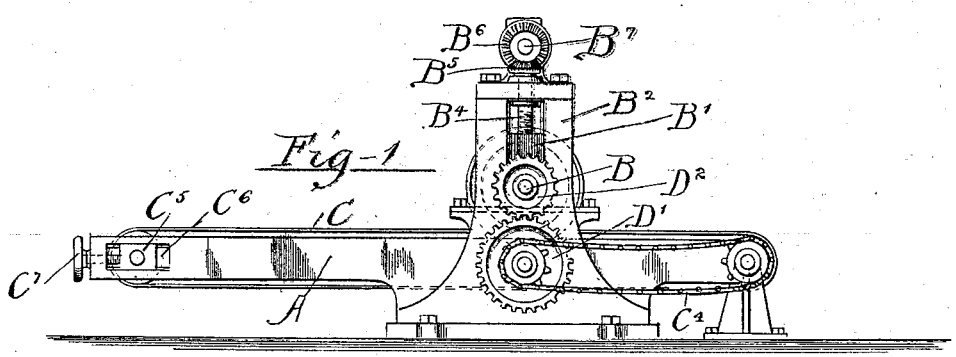
Figure 2:
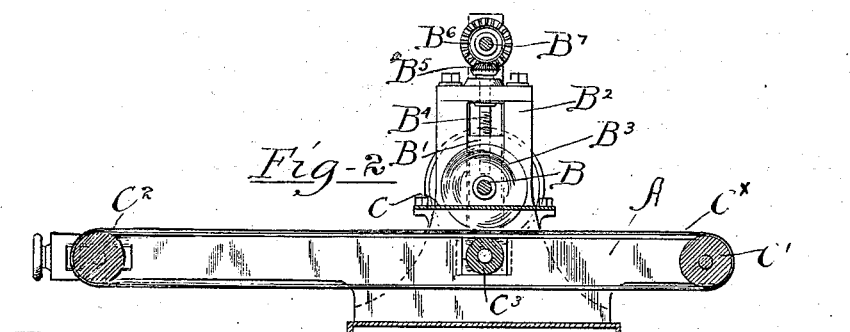
Figure 3:
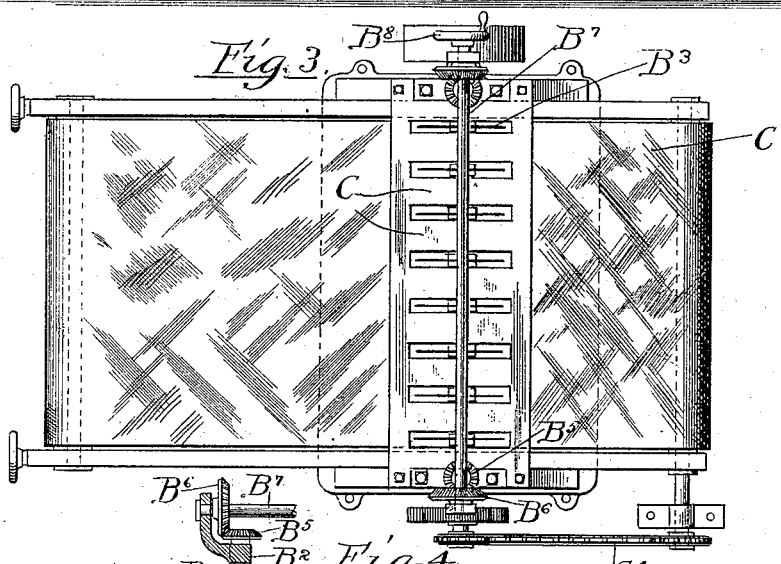
Figure 4:
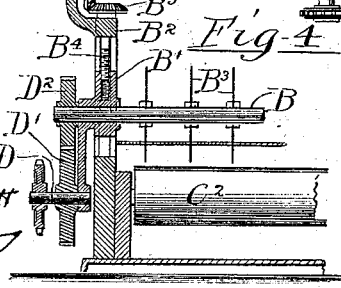

Figure 1 is a side elevation of a machine embodying my invention. Fig. 2 is a longitudinal section through the same. Fig. 3 is a plan view of Fig. 1. Fig. 4 is a cross-section through the machine with parts omitted.

Like letters refer to like parts throughout the several figures.

The operating mechanism of the cutter is supported by a suitable frame A. The shaft B is mounted in movable bearings B' in the standards $B^2$ and is provided with a series of cutters $B^3$. The bearings B' may be provided with any suitable adjusting device. As shown in the drawings, they are provided with threaded openings engaged by the threaded rods $B^4$, mounted in the standards $B^2$ and provided at their outer ends with the beveled pinion $B^5$. A beveled gear $B^6$ on the shaft $B^7$ engages each of these pinions. Said shaft is provided with a hand-wheel $B^8$ or other suitable device by which it may be easily rotated, so as to adjust the position of said bearings. A holding-piece C is interposed between some or all of the cutters and is adapted to hold the material cut and prevent it from being lifted during the operation of cutting. These holding-pieces may be constructed in any desired manner and held in position by any suitable means. An endless belt $C^\times$ passes over the rollers C' $C^2$ and extends beneath the cutters. The roller $C^2$ is mounted in adjustable bearings $C^5$, so that the tension of the belt may be varied. As illustrated in the drawings, these bearings are mounted in slots $C^6$ in the frame and are provided with the adjusting-screws $C^7$. An idle roller $C^8$ is located beneath the cutters and below the belt C. The driving-shaft D is mounted in proximity to the machine and is provided with a gear-wheel D', which engages the gear-wheel $D^2$ on the shaft B. The driving-shaft is connected with the roller C' in any suitable manner, so as to drive the same—as, for example, by the chain $C^4$. As shown in the drawings, the driving-shaft and the shaft B are connected together, so that the adjustment of the shaft B will not affect the connection between the two shafts.

I have described the several parts of my invention in detail; but it is evident that these parts may be varied in form, construction, and arrangement without departing from the spirit of my invention, and I therefore do not wish to be limited to the construction shown.

The use and operation of my invention are as follows: When it is desired to operate the machine, the driving-shaft D is started and the cutters $B^3$ and the belt C are set in motion. The material to be operated upon, which may be of any suitable description, is preferably placed upon a plate or the like in layers of the desired thickness, the plate being placed upon the endless belt. The motion of the belt carries the material under the cutters, and as it passes beneath such cutters it is cut into strips of the desired size. If, for example, it is desired to cut the material into squares, the plate or other device upon which the material is placed is again passed through the machine and is placed upon the belt, so that the second cut produced by the cutters is at right angles to the first cut. When the machine is used to cut candy, for example, the holding-pieces prevent the candy from adhering to the cutters. The cutters may be adjusted to any desired position by means of the hand-wheel $B^8$.

I claim—

In combination, the frame, guide-rollers at opposite ends thereof, an endless belt passing over the same, movable bearings guided in said frame above the belt, a drive-shaft journaled in said bearings, rotary cutters carried thereby, hangers depending from said movable bearings, an idler-shaft journaled in one of said brackets, a gear carried by said idler-shaft meshing with a gear on the drive-shaft and chain - and - sprocket connections from said idler-shaft to one of the guide-pulleys, substantially as described.

FRANK H. WOOLF.

Witnesses:
DONALD M. CARTER,
HOMER L. KRAFT.